United States Patent
Jung

(10) Patent No.: US 11,715,337 B2
(45) Date of Patent: Aug. 1, 2023

(54) CONTROLLER DIAGNOSTIC DEVICE AND METHOD THEREOF

(71) Applicants: Hyundai Motor Company, Seoul (KR); Kia Motors Corporation, Seoul (KR)

(72) Inventor: Ho Jin Jung, Bucheon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 483 days.

(21) Appl. No.: 16/661,647

(22) Filed: Oct. 23, 2019

(65) Prior Publication Data

US 2020/0380796 A1    Dec. 3, 2020

(30) Foreign Application Priority Data

Jun. 3, 2019    (KR) .................. 10-2019-0065636

(51) Int. Cl.
G07C 5/00    (2006.01)
G05B 23/02    (2006.01)
H04L 12/66    (2006.01)

(52) U.S. Cl.
CPC ......... *G07C 5/008* (2013.01); *G05B 23/0272* (2013.01); *H04L 12/66* (2013.01)

(58) Field of Classification Search
CPC .................. G07C 5/008; H04L 12/66
See application file for complete search history.

(56) References Cited

U.S. PATENT DOCUMENTS

| | | | | |
|---|---|---|---|---|
| 2003/0216889 | A1* | 11/2003 | Marko | G07C 5/008 702/182 |
| 2009/0307400 | A1* | 12/2009 | Machauer | H04L 69/32 710/110 |
| 2015/0222553 | A1* | 8/2015 | Macdonald | H04W 4/40 370/230.1 |
| 2017/0171051 | A1* | 6/2017 | Joo | H04L 47/32 |
| 2019/0207862 | A1* | 7/2019 | Kajio | H04L 7/0008 |

* cited by examiner

*Primary Examiner* — Truc M Do
(74) *Attorney, Agent, or Firm* — Morgan, Lewis & Bockius LLP

(57) ABSTRACT

A controller diagnostic method includes transmitting a Diagnostic Trouble Code (DTC) request signal to a plurality of controllers; receiving a first frame of the plurality of controllers in response to the DTC request signal; delaying a transmission time of a flow control signal and transmitting the delayed flow control signal to the plurality of controllers; and receiving a DTC information by at least one consecutive frame provided by the plurality of controllers in response to the delayed flow control signal.

4 Claims, 4 Drawing Sheets

FIG. 3

| | Byte 1 | | | | | Byte 2 | Byte 3 | Byte 4 ~ Byte 7 | Byte 8 |
|---|---|---|---|---|---|---|---|---|---|
| | N_PCItype | | | | Bit 3-0 | | | | |
| | 7 | 6 | 5 | 4 | | | | | |
| Single Frame | 0 | 0 | 0 | 0 | SF_DL | DATA 1 | DATA 2 | ... | DATA 7 |
| First Frame | 0 | 0 | 0 | 1 | FF-DL | | DATA 1 | ... | DATA 6 |
| Consecutive Frame | 0 | 0 | 1 | 0 | SN | DATA 1 | DATA 2 | ... | DATA 7 |
| Flow Control | 0 | 0 | 1 | 1 | FS | BS | STmin | N/A | |

CONTROLLER DIAGNOSTIC DEVICE AND METHOD THEREOF

CROSS-REFERENCE TO RELATED APPLICATION(S)

This application is based on and claims priority to Korean Patent Application No. 10-2019-0065636, filed on Jun. 3, 2019 in the Korean Intellectual Property Office, the disclosure of which is incorporated herein by reference.

TECHNICAL FIELD

The present disclosure relates to a controller diagnostic device and a method thereof, and more particularly, to a device capable of checking a diagnostic trouble code of a controller mounted on a vehicle and a method thereof.

BACKGROUND

A vehicle is generally equipped with numerous controllers, e.g., Electronic Control Units (ECUs). Once production of the vehicle is completed, a diagnostic trouble code (DTC) of the controllers is checked to identify whether the controllers installed in the vehicle are installed correctly.

In the factory production line, Cycle Time (CT: the time required for one process in the case of repeated operation) increases according to the number of the controllers, and therefore, a method for reducing the CT is needed.

SUMMARY

An aspect of the present disclosure is to provide a device capable of shortening a diagnostic time of a vehicle controller by collectively confirming a diagnostic trouble code of a plurality of controllers and method thereof.

Additional aspects of the present disclosure will be set forth in part in the description which follows and, in part, will be obvious from the description, or may be learned by practice of the present disclosure.

In accordance with an aspect of the present disclosure, a controller diagnostic method includes: transmitting a Diagnostic Trouble Code (DTC) request signal to a plurality of controllers; receiving a first frame of the plurality of controllers in response to the DTC request signal; delaying a transmission time of a flow control signal and transmitting the delayed flow control signal to the plurality of controllers; and receiving a DTC information by at least one consecutive frame provided by the plurality of controllers in response to the delayed flow control signal.

The delaying a transmission time of a flow control signal may further include delaying the transmission time by a first time, and the first time may be a response time to the DTC request signal.

The delaying a transmission time of a flow control signal may further include delaying the transmission time by a second time, and the second time may be a processing delay time of a gateway.

The delaying a transmission time of a flow control signal may further include delaying the transmission time by a third time, and the third time may be a delay time of transmission of the DTC information of a controller having a lowest priority among the plurality of controllers.

The delaying a transmission time of a flow control signal may further include delaying the transmission time by a fourth time, and the fourth time may be a time at which the DTC information of the controllers reaches a diagnostic device.

Data length information of the DTC information of the first frame may be included in a Protocol Control Information (PCI) field.

In accordance with another aspect of the present disclosure, a controller diagnostic device includes: a plurality of controllers; a gateway configured to transmit Diagnostic Trouble Code (DTC) information received from the plurality of controllers; and a diagnostic device configured to transmit a DTC request signal to the plurality of controllers, receive a first frame of the plurality of controllers in response to the DTC request signal, and transmit a flow control signal to the plurality of controllers, and delay a transmission time of the flow control signal and receives DTC information based on at least one consecutive frame provided by the plurality of controllers in response to the flow control signal.

The diagnostic device may be configured to delay the transmission time by a first time, and the first time may be a response time to the DTC request signal.

The diagnostic device may be configured to delay the transmission time by a second time, and the second time may be a processing delay time of the gateway.

The diagnostic device may be configured to delay the transmission time by a third time, and the third time may be a delay time of transmission of the DTC information of a controller having a lower priority among the plurality of controllers.

The diagnostic device may be configured to delay the transmission time by a fourth time, and the fourth time may be a time at which the DTC information of the controllers reaches a diagnostic device.

Data length information of the DTC information of the first frame may be included in a Protocol Control Information (PCI) field.

BRIEF DESCRIPTION OF THE DRAWINGS

These and/or other aspects of the present disclosure will become apparent and more readily appreciated from the following description of the embodiments, taken in conjunction with the accompanying drawings of which:

FIG. 3 is a view illustrating a frame structure of a Controller Area Network Transport Protocol (CAN TP) in accordance with an exemplary embodiment of the present disclosure.

DETAILED DESCRIPTION

Figure 1:
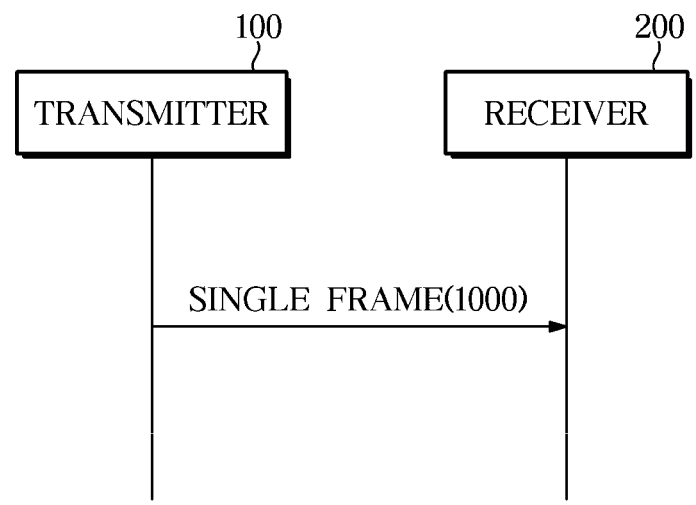
FIG. 1 is a view illustrating a data transmission by a first frame in accordance with an exemplary embodiment of the present disclosure.

Like numerals refer to like elements throughout the specification. Not all elements of embodiments of the present disclosure will be described, and description of what are commonly known in the art or what overlap each other in the embodiments will be omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

Further, when it is stated that a layer is "on" another layer or substrate, the layer may be directly on another layer or substrate or a third layer may be disposed therebetween.

Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise.

As used herein, the terms "portion", "unit", "block", "member", or "module" refers to a unit that can perform at least one function or operation. For example, these terms may refer to at least one process which is performed by at least one piece of hardware such as a field-programmable gate array (FPGA) and an application specific integrated circuit (ASIC), or at least one piece of software stored in a memory, or a processor.

Reference numerals used for method steps are only used for convenience of explanation, but not to limit an order of the steps. Thus, unless the context clearly dictates otherwise, the written order may be practiced otherwise.

Hereinafter, the operating principles and embodiments of the present disclosure will be described with reference to the accompanying drawings.

Figure 2:
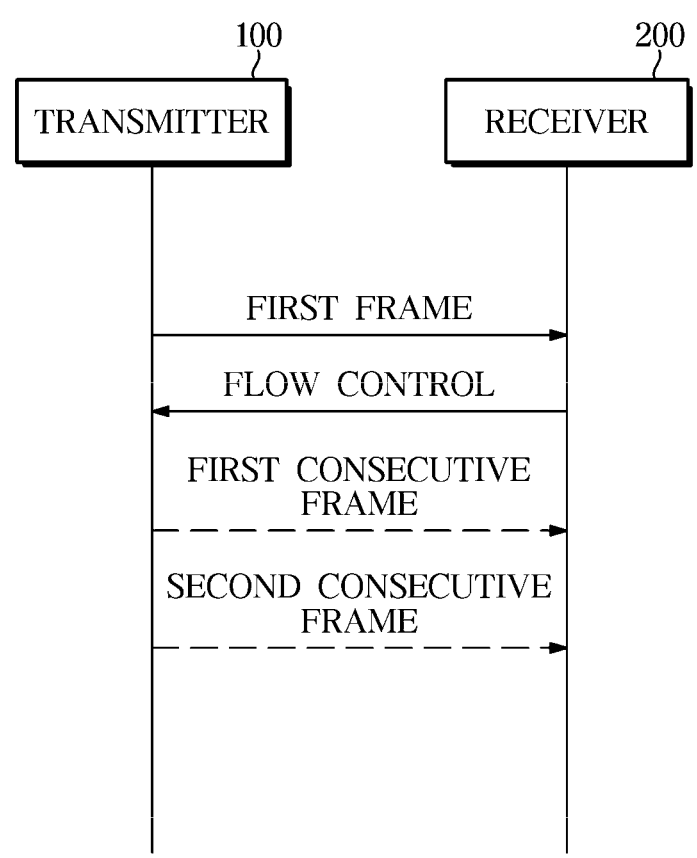
FIG. 2 is a view illustrating a data transmission by a consecutive frame in accordance with an exemplary embodiment of the present disclosure.

FIG. 1 is a view illustrating a data transmission by a first frame in accordance with an exemplary embodiment of the present disclosure, and FIG. 2 is a view illustrating a data transmission by a consecutive frame in accordance with an exemplary embodiment of the present disclosure.

Before vehicle production is completed, a Diagnostic Trouble Code (DTC) for a plurality of controllers mounted on a vehicle is confirmed. The vehicle can perform Controller Area Network (CAN) communication for exchanging data with an external controller or an internal controller.

The unit of data that can be transmitted and received in the CAN communication may be 8 bytes, and a CAN Transport Protocol (TP) method may be adopted to transmit and receive data exceeding 8 bytes.

First, referring to FIG. 1, a case in which transmitting and/or receiving data of 8 bytes or less will be described. For example, a transmitter 100 may use a single frame in a manner to provide a receiver 200 with data of 8 bytes or less. The transmitter 100 may be an Electronic Control Unit (ECU) that provides DTC, and the receiver 200 may be a diagnostic device that is provided with the provided DTC.

Next, a case of transmitting and/or receiving data exceeds 8 bytes will be described with reference to FIG. 2. When the receiver 200 receives data exceeding 8 bytes, the receiver 200 may receive the DTC through the CAN Transport Protocol (TP). Specifically, the CAN TP transmits and receives data through a combination of a first frame (or start frame), a flow control frame, and a consecutive frame (or divided frame). A frame structure of CAN TP is shown in FIG. 3. Here, the single frame can be understood as containing unsegmented messages into a single CAN frame, the first frame can be also understood as a first frame of a segmented message, and the consecutive frame can be understood as a frame preceded by the first frame, and the flow control frame can be understood as being sent when the first frame is received.

The transmitter 100 sets the information on the total data length (FF_DL) to 8 bytes in the Protocol Control Information (PCI) field through the first frame and transmits the information on the total data length to the receiver 200. The field used may be divided into information for discriminating a message and payload data. When the transmitter 100 transmits the first frame through the PCI field, the ECU receiving the information transmits the flow control to the receiver 200 to determine how much data to send at one time and at what interval do. Thereafter, the transmitter 100 transmits the data through the consecutive frames (for example, the first frame and the second frame).

Figure 4:
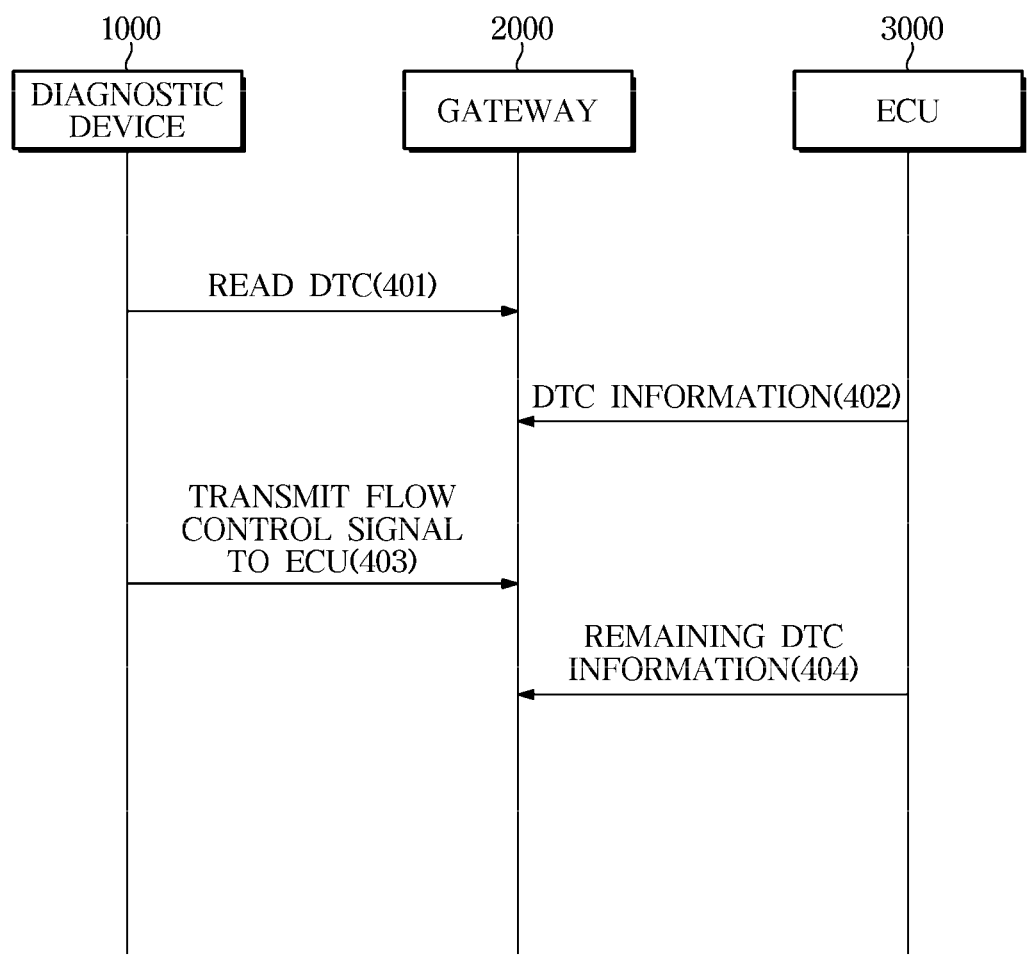
FIG. 4 is s flow diagram of a controller diagnostic method in accordance with an exemplary embodiment of the present disclosure.

FIG. 4 is a flow diagram of a controller diagnostic method in accordance with an exemplary embodiment of the present disclosure. However, it should be understood that the present disclosure is not limited thereto and that some steps may be added or deleted as needed.

A diagnostic device 1000 may include at least one processor (not shown) executing the process and at least one memory (not shown) in which the associated program is stored. The memory and the processor included in the diagnostic device 1000 may be integrated on a single chip or may be physically separated. The diagnostic device 1000 may be a Micro Control Unit (MCU).

Prior to describing the controller diagnosis method according to the embodiment, the conventional method will be briefly described.

There are physical addressing method which performs 1:1 communication for all ECUs, and functional addressing which performs 1:N communication in parallel. In this case, the conventional method receives DTC in order for all the ECUs. The total diagnosis time increases as the number of ECUs increases. Therefore, in the embodiment, functional addressing for performing parallel processing is used. The disclosed embodiment can use 0x7DF as the CAN ID, which is a message format provided to the ECU.

Next, the operation subject of each step performed in the embodiment will be described.

The diagnostic device 1000 may serve as a data path between a gateway 2000, and the gateway 2000 manages a plurality of ECUs 3000. However, the method according to the embodiment mainly describes data exchange between the diagnosis device 1000, the gateway 2000, and the ECU 3000.

First, the diagnostic device 1000 requests a Diagnostic Trouble Code (DTC) to read DTCs of the plurality of controllers (ECUs) (401). At this time, as a CAN ID to be used, 0x7DF may be used.

In response to the DTC request of the diagnostic device 1000, the ECU 3000 provides the first frame, which is information on the DTC, to the diagnostic device 1000 through the gateway 2000 (402).

Then, when receiving the first frame, the diagnostic device 1000 transmits a flow control signal to the plurality of ECUs 3000. At this time, the number of flow control signals to be transmitted corresponds to the number of ECUs mounted on the vehicle (403). The first frame may include the data length information of the DTC information in a Protocol Control Information (PCI) field.

For example, the flow control signal includes information on Block Size (BS) and information on Minimum Separation Time (STmin). BS is information on how much data is sent at one time without flow control, and STmin is information regarding the minimum time interval between message transmissions belonging to the divided frames.

A transmitting time of the first frame is different for each ECU 3000, and the diagnostic device 1000 transmits each flow control in consideration of the point of time when the arrival time is different from each other. At this time, a message dropping phenomenon may occur. Even if only one message concerning the flow control is missed, the ECU 3000 fails to send DTC information by the remaining divided frames, and the communication session for diagnosis is interrupted.

In order to solve the above-described problem, the diagnostic device 1000 may delay the flow control signal in consideration of the following variables in step 403. This is referred to the following Equation 1.

$$P2_{client}=P2_{server\_max}+\Delta P2(\text{Gateway delay}+\text{Busload delay depends on arbitration}+\text{Propagation delay}). \quad [\text{Equation 1}]$$

The diagnostic device 1000 may delay the transmission time of the flow control signal by $P2_{client}$.

$P2_{server\_max}$ corresponds to the performance requirement of the ECU as a response time when the ECU 3000 receives a request for the DTC from the diagnostic device 1000.

Gateway delay indicates the inherent processing delay of the gateway 2000. A processing delay time includes a delay time by the gateway hardware, a CAN message processing time, and a delay time for routing processing between different domains.

"Busload delay depends on arbitration" is a bus load delay time according to priority, and indicates a delay time in which a diagnostic message having a relatively low priority in CAN communication can occur due to a general message being pushed in a high bus load environment.

Finally, the propagation delay indicates the time taken by a message by a communication protocol (e.g., CAN, CAN-FD, Ethernet, etc.) to reach the receiver from the transmitter. In this embodiment, the DTC may be the time required for the ECU 3000 to reach the diagnostic device 1000.

In other words, even if the diagnostic device 1000 receives the first frame from the ECU 3000, if the flow control signal is transmitted through functional addressing after waiting for $P2_{client}$, all the ECUs mounted on the vehicle send a start frame. Therefore, it is possible to process the flow control signal coming into functional addressing.

Thereafter, all the ECUs 3000 transmit the remaining DTC, and particularly, the ECU 3000 transmits DTC to the diagnostic device 1000 through a plurality of consecutive frames.

In an exemplary embodiment, the diagnostic device 1000 transmits a diagnostic trouble code (DTC) request signal to the plurality of controllers, receives a first frame of a plurality of controllers in response to the DTC request signal and to transmit the flow control signal to the plurality of controllers, delays the transmission time point of the flow control signal, and receives the DTC information by at least one consecutive frame provided by the plurality of controllers in response to the flow control signal. The information about the DTC by the consecutive frame is information received in parallel by the plurality of controllers, and the diagnosis time can be shortened unlike the conventional method.

According to the embodiment described above, it is possible to use the present technique without any error by changing only the diagnostic CAN TP structure used in the diagnostic process in the production line, despite the ECU in the vehicle where the SW change is difficult.

According to an aspect of the present disclosure, since the diagnostic trouble codes of a plurality of controllers are collectively confirmed, the total diagnosis time can be shortened.

The disclosed embodiments may be embodied in the form of a recording medium storing instructions executable by a computer. The instructions may be stored in the form of a program code and, when executed by a processor, may generate a program module to perform the operations of the disclosed embodiments. The recording medium may be embodied as a computer-readable recording medium.

The computer-readable recording medium includes all kinds of recording media in which instructions, which may be decoded by a computer, are stored, for example, a Read Only Memory (ROM), a Random Access Memory (RAM), a magnetic tape, a magnetic disk, a flash memory, an optical data storage device, and the like.

While exemplary embodiments have been shown and described above, it will be apparent to those skilled in the art that modifications and variations could be made without departing from the scope of the present invention as defined by the appended claim. For example, the abovementioned exemplary embodiments may be partially combined with each other.

What is claimed is:

1. A controller diagnostic method, comprising:
transmitting a Diagnostic Trouble Code (DTC) request signal to each of a plurality of controllers;
receiving a first frame from the plurality of controllers in response to the DTC request signal;
delaying a transmission time of a flow control signal and transmitting the delayed flow control signal to the plurality of controllers; and
receiving DTC information by at least one consecutive frame provided by the plurality of controllers in response to the delayed flow control signal,
wherein the delaying a transmission time comprises delaying the transmission time by a sum of a first time, a second time, and a third time,
wherein the first time is a response time of the each of the plurality of controllers to the DTC request signal,
wherein the second time is a processing delay time of a gateway, and
wherein the third time is a delay time of transmission of the DTC information of a controller having a lowest priority among the plurality of controllers.

2. The controller diagnostic method of claim 1, wherein the delaying a transmission time comprises delaying the transmission time by a fourth time,
wherein the fourth time is a time at which the DTC information of the plurality of controllers reaches a diagnostic device.

3. The controller diagnostic method of claim 1, wherein data length information of the DTC information is included in a Protocol Control Information (PCI) field.

4. A controller diagnostic device, comprising:
a plurality of controllers;

a gateway configured to transmit Diagnostic Trouble Code (DTC) information received from the plurality of controllers; and a diagnostic device configured to:
- transmit a DTC request signal to the plurality of controllers,
- receive a first frame from the plurality of controllers in response to the DTC request signal,
- transmit a flow control signal to the plurality of controllers,
- delay the transmission time of the flow control signal, and
- receive DTC information based on at least one consecutive frame provided by the plurality of controllers in response to the flow control signal, wherein the diagnostic device is configured to delay the transmission time by a sum of a first time, a second time, and a third time, wherein the first time is a response time of the each of the plurality of controllers to the DTC request signal, wherein the second time is a processing delay time of the gateway, and wherein the third time is a delay time of transmission of the DTC information of a controller having a lowest priority among the plurality of controllers.

* * * * *